(12) United States Patent
Nelson et al.

(10) Patent No.: US 7,305,616 B1
(45) Date of Patent: Dec. 4, 2007

(54) DOCUMENT BUILDER FOR INTERACTIVE DYNAMIC DOCUMENTATION WEB SITE

(75) Inventors: Michael Wayne Nelson, Coon Rapids, MN (US); Michael De Santis, Fair Haven, NJ (US); Roberto Morales, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 563 days.

(21) Appl. No.: 09/751,822

(22) Filed: Dec. 28, 2000

(51) Int. Cl.
*G06F 17/00* (2006.01)

(52) U.S. Cl. .................. 715/517; 715/505; 715/506; 715/507

(58) Field of Classification Search ............. 715/505, 715/506, 507, 511, 517, 520, 522, 523, 526, 715/530
See application file for complete search history.

(56) References Cited

U.S. PATENT DOCUMENTS

| | | | | |
|---|---|---|---|---|
| 5,541,840 A | * | 7/1996 | Gurne et al. ............... | 701/33 |
| 5,963,967 A | * | 10/1999 | Umen et al. ............... | 715/513 |
| 6,055,522 A | * | 4/2000 | Krishna et al. ............ | 715/517 |
| 6,181,992 B1 | * | 1/2001 | Gurne et al. .............. | 701/29 |
| 6,356,903 B1 | * | 3/2002 | Baxter et al. .............. | 707/10 |
| 6,356,909 B1 | * | 3/2002 | Spencer .................... | 707/10 |
| 6,498,657 B1 | * | 12/2002 | Kuntz et al. ............... | 358/1.15 |
| 6,591,289 B1 | * | 7/2003 | Britton ...................... | 709/203 |
| 6,601,232 B1 | * | 7/2003 | Burba et al. ............... | 717/100 |

* cited by examiner

*Primary Examiner*—Stephen Hong
*Assistant Examiner*—Gregory J. Vaughn
(74) *Attorney, Agent, or Firm*—Stolowitz Ford Cowger LLP

(57) ABSTRACT

A method for building user customizable documents. In one embodiment, the present invention is comprised of a selectable plurality of templates. In the present embodiment, the selected template is comprised of sections, sub-sections, and fields for inclusion in a particular document. A user is enabled to specify which sections, sub-sections, and fields are to be included in the particular document. A user is further enabled to determine the sequence of the sections, sub-sections, and fields that are to be included in the particular document. The present invention is further comprised of content comprising selectable subject matter for inclusion in the particular document. The sections, sub-sections, and fields are relative to the selected subject matter of the particular document to be built.

20 Claims, 14 Drawing Sheets

DOCUMENT BUILDER FOR INTERACTIVE DYNAMIC DOCUMENTATION WEB SITE

FIELD OF THE INVENTION

The present invention relates to a method and apparatus for document building of content in a network environment. More particularly, the present invention provides a customizable document builder for an interactive dynamic documentation web site.

BACKGROUND OF THE INVENTION

When an individual, or groups or teams of individuals, utilize the Internet to search for and to access a web site that contains specific information/data, e.g., some type of technical information that is pertinent to that individual's search, the information/data that is returned to those individuals, via a graphical display, has been previously compiled. This means that the information/data that is presented to the individual is only as current as the last update. It is, unfortunately, commonplace for the most recent update to have taken place weeks, months, or, in some instances, years earlier.

The information/data, e.g., technical information regarding a company's product, that is available to the individual, or groups thereof, is the result of a rather laborious process of acquiring the necessary information, categorizing the information into related sections, compiling that information into a, hopefully, well organized format, which will then allow an individual to obtain the information/data that is pertinent to their specific needs.

The acquisition, categorization, compilation, presentation, and the subsequent mandatory maintenance of that technical information is an extremely expensive, time consuming and laborious task. Current methods used for knowledge acquisition and subsequent propagation to its audience are time consuming, very inefficient and expensive. Access to the experts, e.g., development engineers, software developers, field engineers, etc., who supply the source information is difficult at best due to their busy schedules. As such, they have a minimal amount of time to contribute to and/or to review the technical information to be documented, much less spending time explaining things to those who are directly involved in the writing and creating of the technical guide. In addition, pulling them away from their primary tasks could be directly associated with added costs of product development as well as impacting the projected delivery date of their company's products. However, their collaboration, with regard to the technical information, is clearly required throughout all phases of deployment of, e.g., that company's product/solution.

Additionally, it is also important to obtain the information to be utilized from a wide array of organizations and perspectives such as technical assistance centers, field organizations, and professional services. It would be especially advantageous to have a more comprehensive knowledge base from which to draw the information, therefore providing to an individual a more complete reference material.

Furthermore, dissemination of the technical information/data is critical to the success of a company's product line as the production/solution must be supportable throughout all phases of deployment of that product.

Currently, common viable means of gathering this information from the engineers, developers, and other experts include, in one example, the acquisition of the information through countless e-mails, which is accompanied by the usual wait time for a response. Another method of gathering the information can be through conference calls between the involved contributors, provided, of course, that each contributor has the time available. As is well known, scheduling conflicts among engineers and developers are not uncommon, which can postpone the conference calls for days, weeks, or even months, which could delay the release of the company's products. Additionally, another means of gathering the information involves the off-site meeting, which, by virtue of the travel required, is even more difficult to schedule than a conference call.

All of these factors contribute to unnecessarily incurred expenses in either the time spent tracking down the information, or in time spent completing the information when acquired in a fragmented form, or in the time and effort spent determining if there was a duplication of the information obtained. Other factors that may contribute to the higher costs of production and/or deployment of a company's product/solution may include the determination of whether the information obtained is marginal, with regard to the appropriateness of the content, and/or incomplete documentation, and the delayed transfer of that information from the engineers, developers, and the like.

Once the information has been obtained, the question remains of how to publish the information. Common publishing methods have numerous drawbacks. One such draw back to the customary methods of publishing technical guides, e.g., troubleshooting guides, is that the desired information is usually in a format dictated by the author or company thereof. Because of the technical guide's fixed format, it is quite common for a published technical guide to contain sections or portions thereof that are of very little interest to a user. A reader or user may only want one specific section, or a select portion of the guide, and therefore may have little or no use for other sections or portions that are not related to their specific requirements.

An additional drawback to the customary methods of online publishing is that the order in which the content of the document, e.g., a technical guide, is presented is controlled by the author or the company thereof. For example, the order of the content in the document may be in proper order to a company or author distributing a document such as troubleshooting guide. However, to a different individual or company, the order of that same document may appear to have been organized in a totally haphazard, illogical, and confusing manner.

A further draw back to the customary methods of the publishing of technical guides, is that once the information has been assimilated, it is usually presented to the individual in a completed format, where the individual has to view the entire technical guide. This wastes not only the individual's time having to read through the entire guide, regardless of whether the information is relevant, but also wastes either space on the storage device when it is saved in an electronic form or it wastes natural resources by requiring the printing of the entire document.

Thus, a need exists for a method of receiving user submitted information that not only has continuous, simultaneous and omnipresent availability to all potential information providers, but also is capable of storing and categorizing that information as it is received. A further need exists for providing feedback to the user who submitted the information. Additionally, a need exists for a method to make this information available to all potential users of the information as soon as it is received.

Thus, a need exists for providing a method for documents, e.g., technical guides, to be published or distributed such that the information contained within the document is current and up-to-date. Another need exists for a method of distributing or publishing the document in such a manner that the entire document does not need to be published. An additional need exists for a method for providing a way for a user to determine the order of the document, thereby fulfilling their particular requirement at that particular time. A further need exists for a method that provides a way for a user to determine the output formatting properties of the document. Additionally, a need exists for a method that provides a way for a user to determine the content, e.g., technical information, of the document to be distributed or published.

SUMMARY OF THE INVENTION

Accordingly, the present invention provides a method for generating a plurality of templates utilized in building user customizable documents. In one embodiment, the present invention is comprised of a selectable plurality of templates. In this embodiment, the selected template is comprised of sections, sub-sections, and fields for inclusion in a particular document. A user is enabled to specify which sections, sub-sections, and fields are to be included in the particular document. A user is further enabled to determine the sequence of the sections, sub-sections, and fields that are to be included in the particular document. The present invention is further comprised of content comprising selectable subject matter for inclusion in the particular document. The sections, sub-sections, and fields are relative to the selected subject matter of the particular document to be built.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
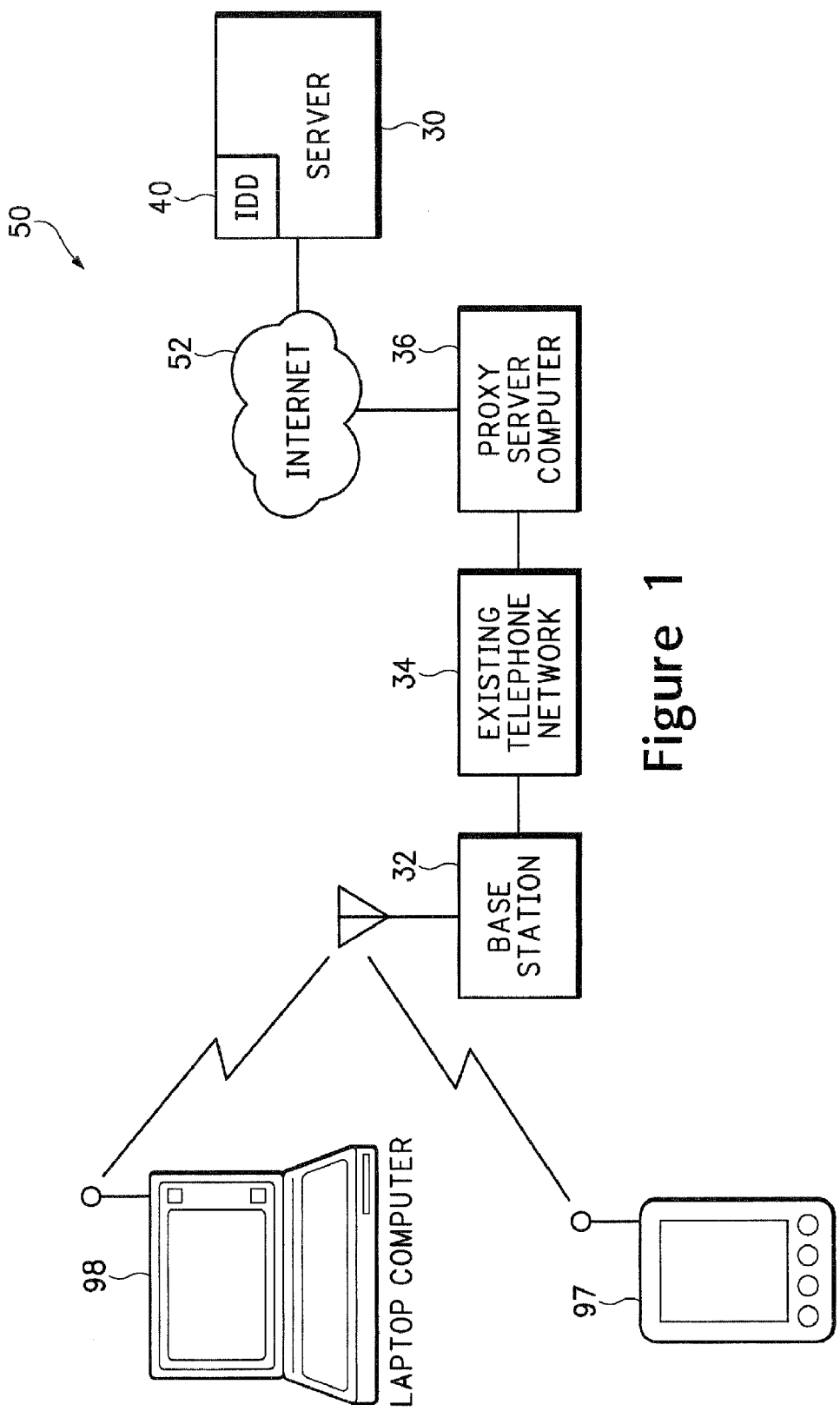
FIG. 1 is a block diagram of an exemplary network environment including a portable computer system and a laptop computer system, in accordance with one embodiment of the present invention.

A method and apparatus for providing a document builder for customizing documents to be published in a network environment is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "clicking on" or "selecting" or "choosing" or "entering" or "indicating" or "submitting" or "receiving" or "performing" or "initiating" or "sending"

or "implementing" or "disabling" or "enabling" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention, a method for building user customized documents, is discussed primarily in the context of web based information available online. In one example of one embodiment of the present invention, the information is of a technical nature. However, it is appreciated that the present invention can be implemented for utilization with almost any type of information. It should be further appreciated that the present invention may be used by most types of devices that have the capability to access some type of central device or central site.

For purposes of the present application, the term "handheld computer system" is not limited solely to conventional handheld or palmtop computers. Instead, the term "handheld computer" or "handheld computer system" or "palmtop computer system" is also intended to include any mobile device which can be used to communicate with a network. Such mobile devices include but are not limited to pagers and paging systems, wireless and cellular telephones, electronic address books, and numerous other mobile devices which have the ability to communicate with a network or other computers, either through a wired or wireless connection. As such, for purposes of the present application, the terms "handheld computer" and "palmtop device" and "palmtop computer system" will be considered synonymous and will be used interchangeably throughout the present application.

For purposes of the present application, the term "laptop computer" or laptop computer system" is intended to include any easily transportable computer system that is not classified as a "palmtop computer, or handheld computer, or handheld computer system." Furthermore, the "laptop computer" is configured such that it has the ability to communicate with a network or other computer systems, either through a wired connection e.g., a modem or NIC (network interface card) and the like, or through a wireless connection.

For purposes of the present application, the term "desktop computer" or "desktop computer system" is intended to include those computer systems that are not easily transportable, e.g., a desktop computer system or a computer workstation and the like. Furthermore, the "desktop computer" is configured such that it has the ability to communicate with a network or other computers, either through a wired connection e.g., a modem or a NIC (network interface card) and the like, or through a wireless connection.

FIG. 1 is a block diagram of an exemplary network environment 50 including a portable computer system 97, a laptop computer system 98 and server 30, in which is located IDD (interactive dynamic documentation web site) 40, one embodiment of the present invention. Base station 32 can be both a transmitter and receiver base station, which can be implemented by coupling it into an existing public telephone network 34. Implemented in this manner, base station 32 enables portable computer system 97 and/or laptop computer system 98 to communicate with a proxy server computer system 36, which is coupled by wire to the existing public telephone network 34. Furthermore, proxy server computer system 36 is coupled to the Internet 52, thereby enabling portable computer system 97 and/or laptop computer system 98 to communicate with the Internet 52 thereby enabling access to IDD (interactive dynamic documentation web site) 40 located within server 30. When communicating with a web site over Internet 52, protocols such as CTP (Compact Transport Protocol) and CML (Compact Markup Language) and protocols such as HTTP (Hypertext Transfer Protocol) and HTML (Hypertext Markup Language) can be utilized by portable computer system 97, laptop computer 98, and/or desktop computer system 99 of FIG. 2, in the present embodiment.

It should be appreciated that one of the functions of proxy server 36 is to perform operations over the Internet 52 on behalf of portable computer system 97 and/or laptop computer 98. For example, proxy server 36 has a particular Internet address and acts as a proxy device for portable computer system 97 and/or laptop computer system 98 over the Internet 52.

It should be further appreciated that other embodiments of a communications network, planned or envisioned, may be utilized in accordance with the present invention. For example, a wireless connection may be made from portable computer system 97 and/or laptop computer system 98 directly to the Internet 52 to access IDD (interactive dynamic documentation web site) 40 located within server 30.

The data and information, communicated between base station 32 and portable computer system 97 and/or laptop computer system 98, are the same type of information and data that can conventionally be transferred and received over a public telephone wire network system. Additionally, in FIG. 1, the existing telephone network could also be a packet-based network, as is utilized by some computer systems. However, a wireless communication interface is utilized to communicate data and information between portable computer system 97 and/or laptop computer system 98 and base station 32. Furthermore, any wireless network can support the functionality to be disclosed herein.

Figure 2:
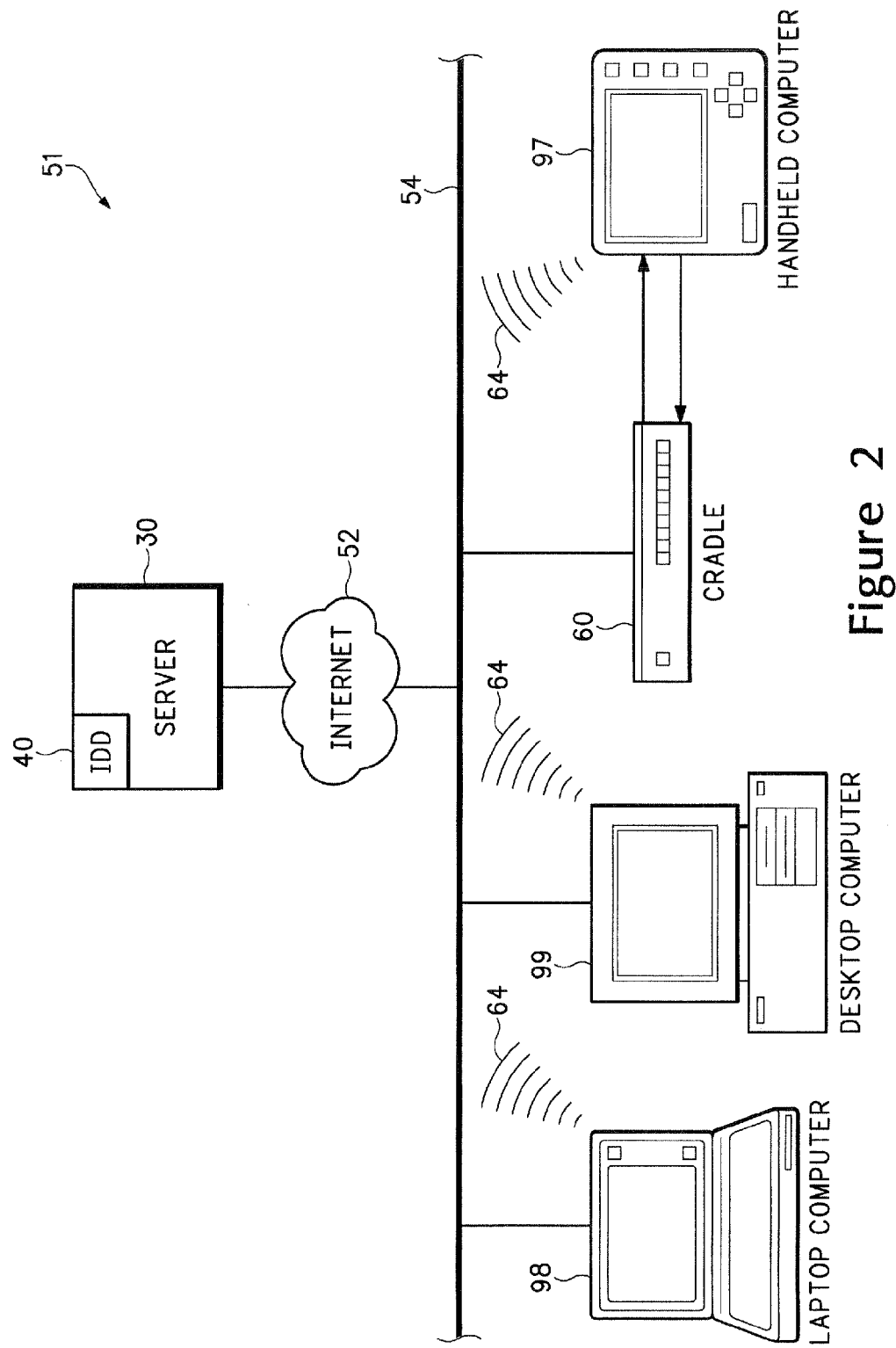
FIG. 2 is a block diagram of an exemplary network environment including a portable computer system, a laptop computer system, and a desktop computer system, in accordance with one embodiment of the present invention.

FIG. 2 illustrates another embodiment of a system 51 that can be used in conjunction with various embodiments of the present invention. System 51 is shown as comprising a desktop computer system 99, a laptop system 98, a handheld computer system 97, Internet 52, and server 30, in which is located IDD (interactive dynamic documentation web site) 40. Optionally, one or more desktop, laptop, and/or handheld computer systems can be used within system 51. Desktop computer system 99 and laptop computer 98 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52, using a number of well-known protocols, to provide access to IDD (interactive dynamic documentation web site) 40 located within server 30.

Importantly, bus 54 is also coupled to a cradle 60 for receiving and initiating communication with handheld computer system 97. Cradle 60 provides an electrical and mechanical communication interface between bus 54 (and anything coupled to bus 54) and handheld computer system 97 for two-way communications. Handheld computer system 97 may instead be coupled to desktop computer system 99 and/or laptop computer system 98 via a wireless (radio) connection. Handheld computer system 97, laptop computer system 98, and/or desktop computer system 99 may also contain a wireless infrared communication mechanism 64 for sending and receiving information from other devices.

With reference to both FIGS. 1 and 2, it is appreciated that handheld computer system 97, laptop computer system 98, and/or desktop computer system 99, can be used in a network environment combining elements of networks 50 and 51. That is, handheld computer system 97, laptop computer system 98, and/or desktop computer system 99, can include both a wireless infrared communication mechanism and a signal (e.g., radio) receiver/transmitter device.

It should also be appreciated that, in one embodiment of the present invention wherein server 30 is disposed internal of a intranet network configuration (located within the firewall of an organization or corporation), Internet 52 is not required for access to IDD (interactive dynamic documentation web site) 40 located within server 30. Desktop computer system 99, laptop computer system 98, and/or handheld computer system 97 may be communicatively coupled to server 30 and IDD 40, through bus 54 which may be configured as a network communication line, e.g., a local area network (LAN), a wide area network (WAN), a metropolitan area network (MAN), or most other network configurations that enable communication between computers.

The mechanisms for communicatively coupling computer systems over the Internet or over Intranets are well-known in the art. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). IDD (interactive dynamic documentation web site) 40, located within server 30, may be accessed through a series of connected hubs, routers, bridges, and switches, configured to provide access to server 30 which contains IDD (interactive dynamic documentation web site) 40. It should be further appreciated that other embodiments of a communications network, planned or envisioned, may be utilized in accordance with the present invention.

Figure 3:
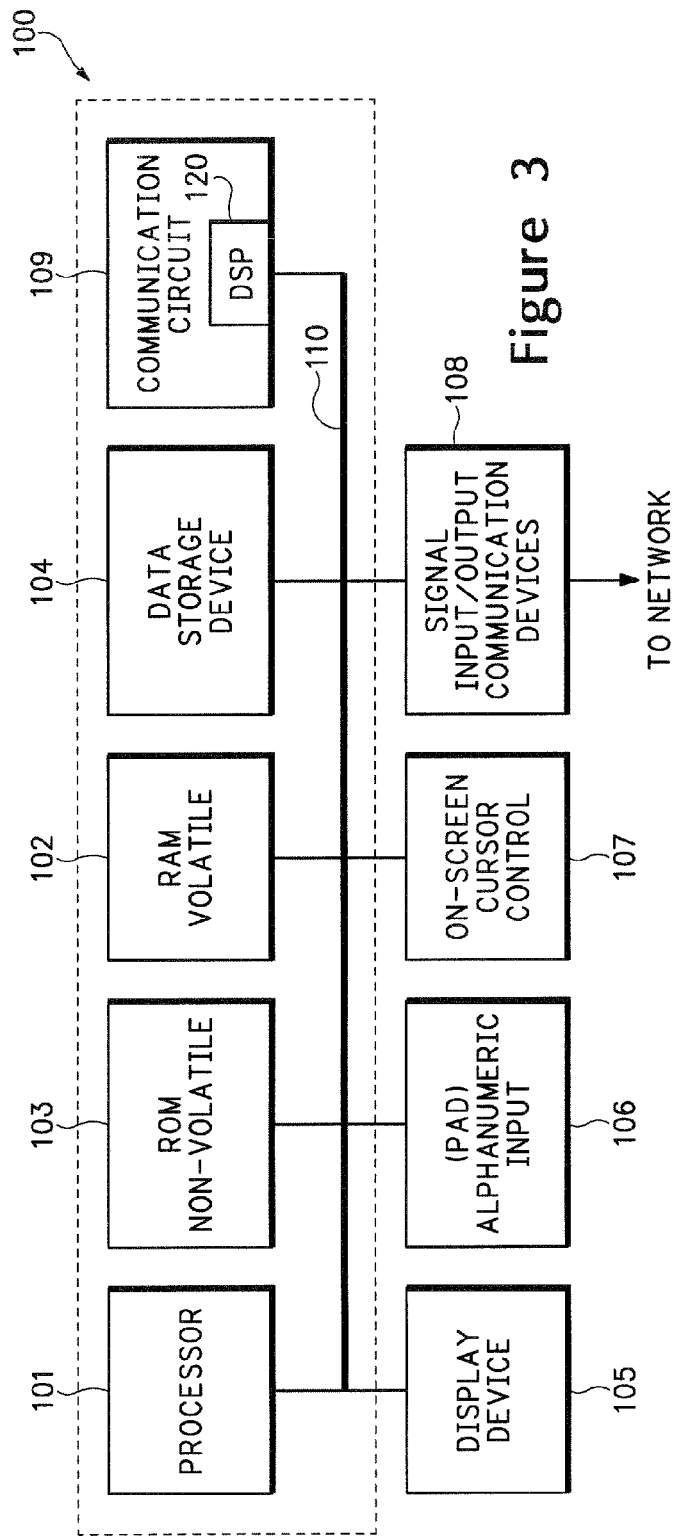
FIG. 3 is a block diagram depicting an exemplary computer system, in accordance with one embodiment of the present invention.

FIG. 3 is a logical block diagram that illustrates circuitry of an exemplary computer system 100, which can be implemented within handheld computer system 97, laptop computer system 98, desktop computer system 99, and/or server 30 upon which embodiments of the present invention may be practiced. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes a data storage device 104 coupled with the bus 110 for storing information and instructions. Data storage device 104 can be, for example, an HDD (hard disk drive), an FDD (floppy disk drive), a memory stick, a CD-RW (compact disk with write functionality), a tape drive, etc., and furthermore device 104 can be in multiples or in a combination thereof. Data storage device 104 may also be removable or hot swappable (connected or unconnected while computer is powered).

With reference still to FIG. 3, computer system 100 also includes a signal transmitter/receiver device 108, which is coupled to bus 110 for providing a physical communication link between computer system 100, and a network environment (e.g., network environments 50 and 51 of FIGS. 1 and 2, respectively). As such, signal transmitter/receiver device 108 enables central processor unit 101 to communicate with other electronic systems coupled to the network. It should be appreciated that the present embodiment of signal transmitter/receiver device 108 is well suited to be implemented in a wide variety of ways. In one example, signal transmitter/receiver device 108 is coupled to an antenna and provides the functionality to transmit and receive information over a wireless communication interface. In another example, signal transmitter/receiver device 108 could be implemented as a modem. In yet another example, device 108 could be configured as a NIC (network interface card).

In FIG. 3, in one embodiment, computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 3 is an optional alphanumeric input device 106. In one implementation, e.g., when utilized in handheld computer system 97, device 106 is a handwriting recognition pad ("digitizer"). In another implementation, e.g., when utilized in either laptop computer system 98 and/or desktop computer system 99, device 106 is a keyboard. Alphanumeric input device 106 can communicate information and command selections to processor 101.

Computer system 100 of FIG. 3 also includes an optional cursor control or directing device (on-screen cursor control 107) coupled to bus 110 for communicating user input information and command selections to processor 101. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

In one implementation, e.g., when utilized in handheld computer system 97, on-screen cursor control device 107 may be a touch screen device incorporated with display device 105. On-screen cursor control device 107 is capable of registering a position on display device 105 where the stylus makes contact. In another implementation, e.g., when utilized in laptop computer system 98, on-screen cursor control device 107 may be a touch pad, or, in another implementation, a finger activated push stick. In another implementation, e.g., when utilized in desktop computer system 99, on-screen cursor control device 107 may be a mouse or similar pointing device.

As described above, computer system 100 also contains a display device 105 coupled to the bus 110 for displaying information to the computer user. Display device 105 is suitable for generating graphic images and alphanumeric characters recognizable to the user. Any of a number of display technologies can be used, e.g., cathode ray tube (CRT), liquid crystal display (LCD), field emission display (FED), thin film transistor (TFT), plasma, etc., for display device 105.

Figure 4:
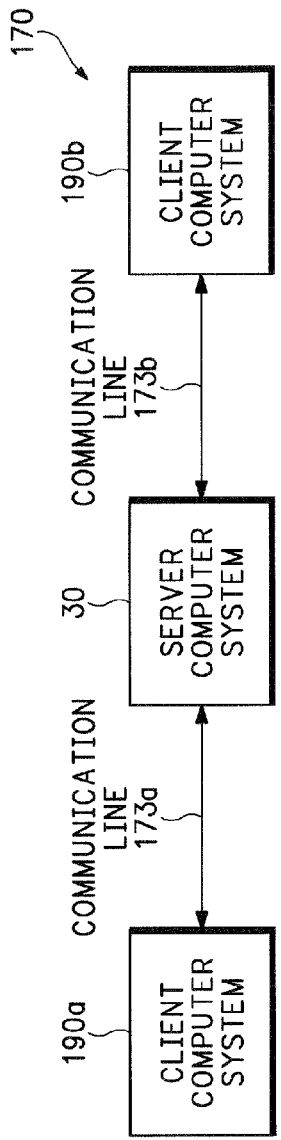
FIG. 4 is a block diagram depicting an exemplary client/server environment, in accordance with one embodiment of the present invention.

FIG. 4 is a block diagram illustrating an exemplary client-server computer system network 170 upon which embodiments of the present invention may be practiced. Network 170 may be a communication network located within a firewall of an organization or corporation (an "Intranet"), or network 170 may represent a portion of the World wide Web or Internet. Client (or user) computer systems 190a and 190b and server computer system 30, wherein IDD (interactive dynamic documentation web site) 40 is disposed, are communicatively coupled via communication lines 173a and 173b; the mechanisms for communicatively coupling computer systems over the Internet or over Intranets are well-known in the art. This coupling can be accomplished over any network protocol that supports a network connection, such as IP (Internet Protocol), TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer 30 via an input/output port (e.g., a serial port) of server computer system 30; that is, client computer systems 190a and 190b and server computer system 30 may be non-networked devices. Though network 170 of FIG. 4 is shown to include one server computer system 30, it is appreciated that more than one server computer system 30 can be used.

In general, the layout language for a Web document is Hypertext Markup Language (HTML). Web documents are stored in HTML format in association with "server" software on remote servers. A Web document is given a "Uniform Resource Locator" (URL) which is essentially an address path identifying the server which hosts the desired document plus the location of the document on the server. Using "browser" software, an end-user can send a request from a client computer to access a document stored at a particular URL. Browser software such as Netscape™ Navigator, of Netscape Communications Corporation of Mountain View, Calif., is well known and widely available. When the server receives the user's request, it sends the requested HTML Web document to the client where the document can be displayed. The communication protocol used in making such a request and in transferring Web documents is "Hypertext Transfer Protocol" (HTTP).

Description of the Interactive Dynamic Documentation Web Site

It should be noted that in the context of the present invention, the term "solution" is meant to represent one or more products being used in conjunction with each other to achieve a common goal, such as e.g., Thunder Dial, which might include a router, a signal controller, and a signaling link terminal. It should be further noted that the term "product" is meant to represent a single component of that solution, such as the signaling controller.

It should be further appreciated that in the context of the disclosure, the term user is considered an authorized user, such that the authorized user has been granted access to IDD 40. The user is subject to administrative permission levels, such that authorized users have various levels of access, dependent upon the authorized user's classification.

Figure 5:
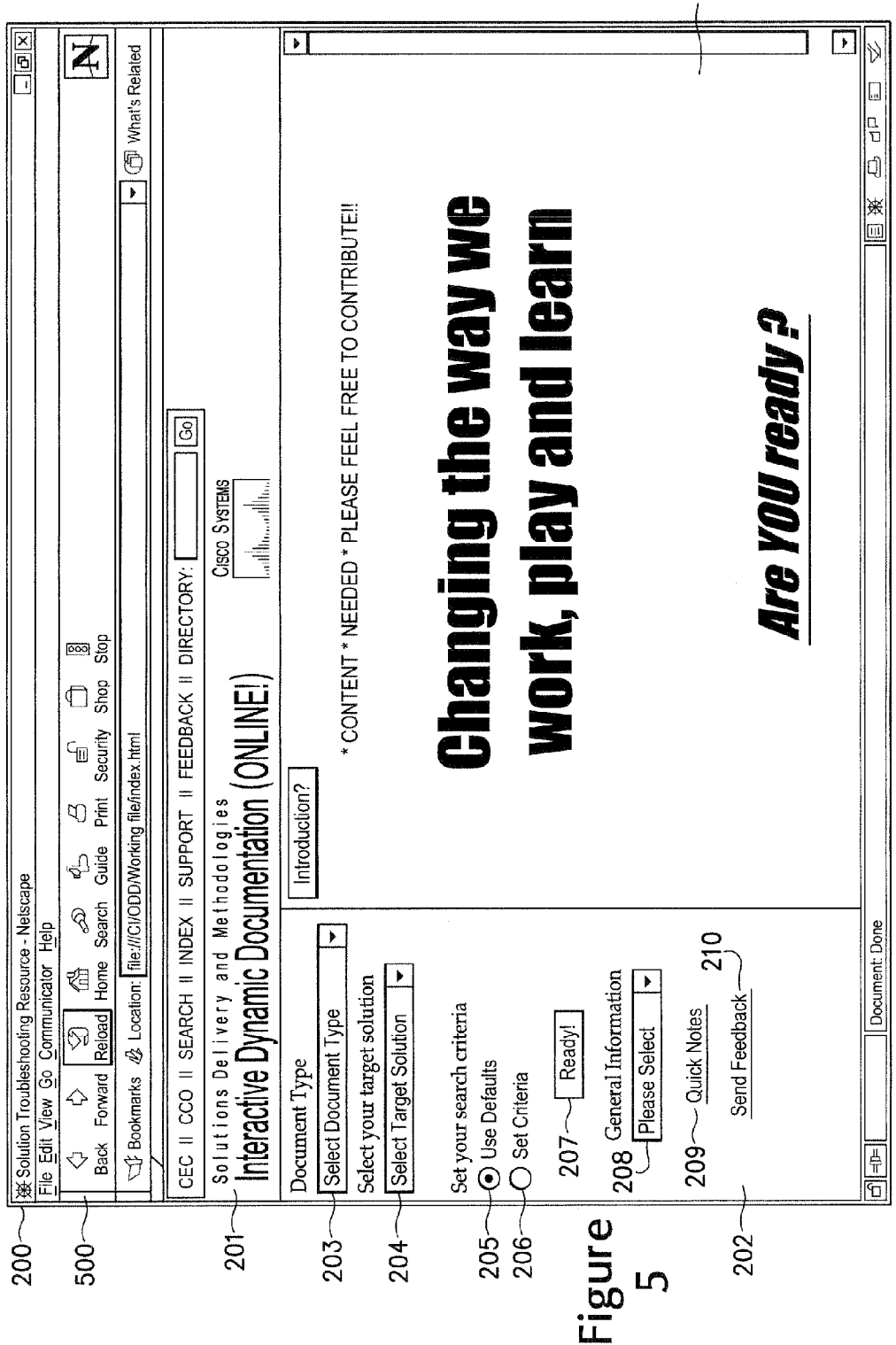
FIG. 5 is a computer generated screen shot depicting one web page of the present invention, in accordance with one embodiment of the present invention.

Referring to FIG. 5, index/home page 200 of IDD (interactive dynamic documentation web site) 40 is shown. Index page 200 is the default opening page that is displayed when an individual first initiates access to IDD (interactive dynamic documentation web site) 40, in one embodiment of the present invention. It is through index page 200 that all subsequent pages are accessible. Title bar 201 is shown as disposed directly below Netscape™ browser menu bar 500. It should be appreciated that while IDD (interactive dynamic documentation web site) 40 is, in one embodiment of the present invention, depicted and described utilizing the Netscape™ browser, this should not be construed as a limitation as to the type of Internet browser that can be utilized. In fact, nearly any Internet browser may be utilized to access IDD 40.

Still with reference to FIG. 5, beneath title bar 201 are two defined regions. On the left is defined region 202 and on the right is defined region 211. Region 202 is comprised of, from top to bottom, PDM (pull down menu) 203, PDM (pull down menu) 204, radio buttons 205 and 206, ready button 207, (pull down menu) 208, and link 209 and link 210.

Further, regarding FIG. 5, in each instancing of the PDM (pull down menu), a different category is listed. PDM (pull down menu) 203, in this example of one embodiment of the present invention, is disposed near the top of region 202. In this embodiment of the present invention, PDM 203 contains selections pertaining to available document types such as e.g., site survey, solution design guide, and others. By specifying the document type, this will drive the manner in which the content of that document type is presented to the user. PDM (pull down menu) 204, located directly below PDM 203 contains selections regarding a variety of target solutions/products in one embodiment of the present invention. As previously recited, a solution is a term for a group of interrelated products that, in combination, fulfill the customers particular needs. By specifying the target solution/product, this will drive all subsequent queries and data retrieval, relative to the selected document type. To access the information contained within IDD (interactive dynamic documentation web site) 40, an individual selects from the pull down menus disposed within region 202, which provide the assorted subject matter from which to choose.

Figure 7A:
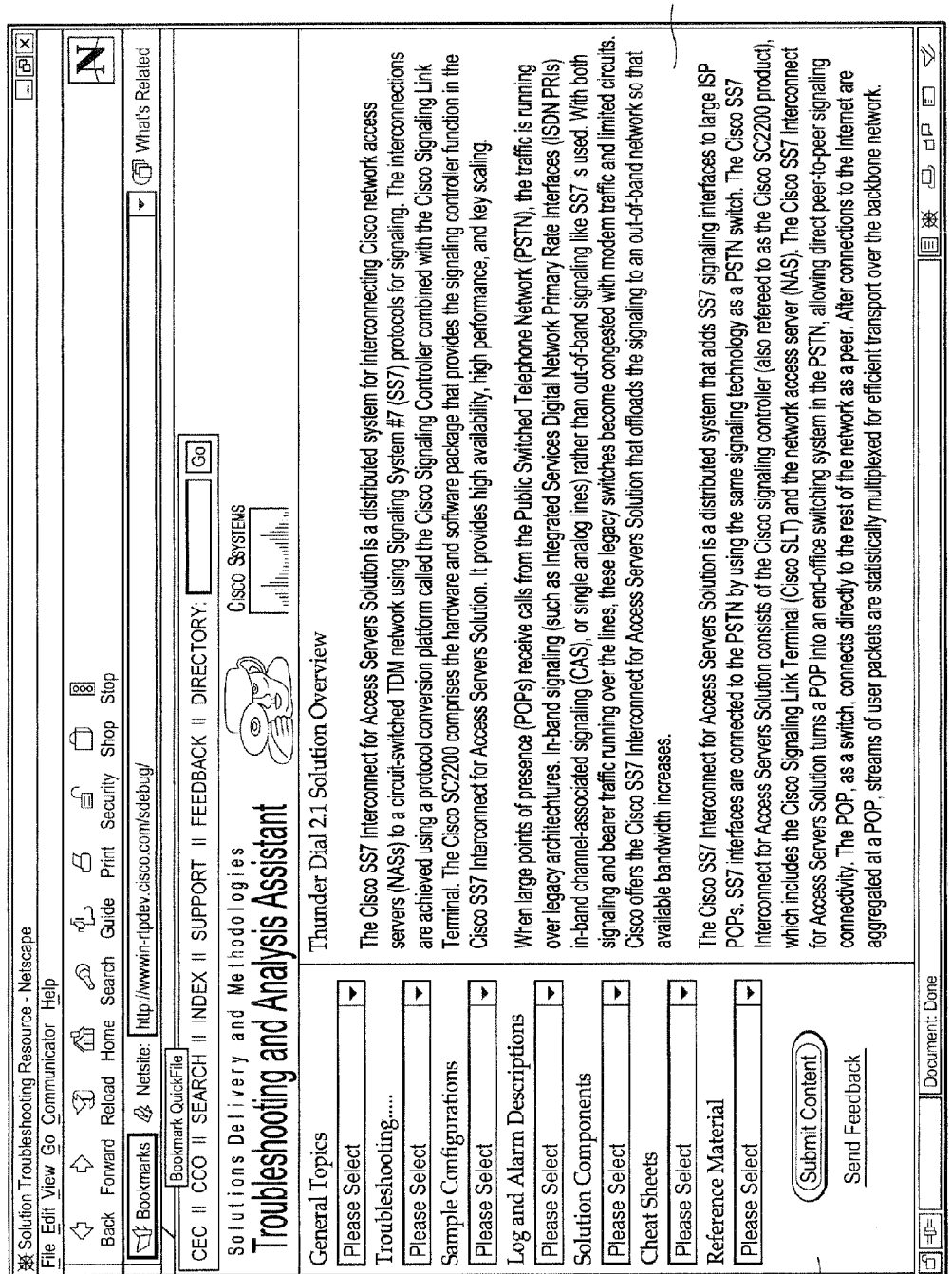
FIG. 7A is a computer generated screen shot depicting a web page of the present invention, in accordance with one embodiment of the present invention.

Still referring to FIG. 5, disposed beneath PDM (pull down menu) 204 are default radio button 205, set criteria radio button 206, and ready button 207. Default radio button 205 is disposed above set criteria radio button 206 and set criteria radio button 206 is disposed above ready button 207, in one embodiment of the present invention. Default radio button 205 is adapted to be utilized when a user desires to obtain all the available information regarding a specific solution or product, in this embodiment of the present invention. Set criteria radio button 206 is adapted to be utilized when a user desires to further define and narrow the scope of the available information they are obtaining regarding a particular solution or product, in this embodiment of the present invention. After a user selects the target solution, and the default or the set criteria button, that user clicks on ready button 207, which triggers the retrieval of the data relevant to the solution/product previously chosen. In one embodiment of the present invention, when the user selects set criteria button 206, and clicks on ready button 207, additional pull down menus, such as those shown disposed within region 202 of FIG. 7A, are presented to the user to assist in further specifying the information to be retrieved. As shown in FIG. 7A, in this example of one embodiment of the present invention, multiple pull down menus, different from the pull down menus from FIG. 5, are disposed within region 202 and a general solution overview is disposed within region 211.

It should be appreciated that many of the web pages that comprise IDD (interactive dynamic documentation web site) 40 have functions and different physical layouts that are dependent upon the user's purpose and/or the type of information or data with which the user desires to interact. In one embodiment, there may be two or three pull down menus disposed within region 202, as depicted in FIG. 5. In another embodiment, there may be more than six pull down menus within that same region, as depicted in FIG. 7A. In another embodiment, there may not even be a region 202 or region 211 within a web page presented to the user, as depicted in, e.g., FIG. 5A. In fact, there is an almost unlimited number of web page configurations, layouts, and associated components (pull down menus, buttons, links, etc.) that can comprise the IDD web site.

It should also be appreciated that while, in one embodiment of the present invention, HTML (hypertext markup language), a well known mark-up language, was utilized to create the web pages that comprise the IDD web site, other mark-up languages that possess the capability of creating web pages, such as, e.g., XML (extensible markup language), SGML (standard generalized markup language) of which HTML is a subset, or CML (compact markup language) may be utilized.

It should be further appreciated that the IDD (interactive dynamic documentation web site) 40, in one embodiment of the present invention, is additionally comprised of an auto email notification feature. In one embodiment, the auto email notification is utilized in feedback of content that was submitted by authors or providers (development engineers). IDD 40 provides extensive benefits to its user group by opening up the entire content collection activity to a wider audience (information depth and breadth) and by promoting the immediacy of information (validation). Furthermore, it ensures that content is accurate and as current as possible. Additionally, IDD 40 provides critical benefits to the document authors and content providers (development engineers).

In one example, development engineers write software with a variety of log messages and alarms. Their understanding of the code and the reason for adding a log message or alarm may be intuitive from their perspective. However, users of their software will not have the same depth of understanding. Therefore, the logs and alarms are likely to lack comprehensive descriptions that meets the users needs. The user(s) can provide this feedback to the developer, simply by adding a comment to the particular log or alarm message. In another example, this auto email notification may involve a specific command set. The original author of the article or document section may have a limited understanding of the type of information the user(s) need and will themselves benefit from the feedback gained from a user placing a comment on the item.

In one embodiment of the present invention, IDD (interactive dynamic documentation web site) 40 universally applies the concept of auto email notification so that adding new content, correcting content, validating content, commenting on content, and document building can all generate email notifications to a subset of associated users. IDD 40 provides interfaces so that users can be added as recipients of these notifications based on need. Those interfaces also enable a user to designate whether or not they wish to receive the auto email notifications. In one example of one embodiment of the present invention, a user may want to be notified when new log messages are added but not want to be notified when a new technical tip is added. A development engineer may want to notified when a comment is placed against one of his alarm messages but not when a comment is placed against one of the alarm messages that a co-developer had written, and so forth.

It should be further appreciated that administrators or technical leads are enabled to customize the auto email notifications. User IDs can be added and/or deleted per topic, per comment, per validation, per correction, as well as by document type and by selected content of a document type. The resulting lists can also be viewed as a reference to who else is receiving notifications.

In one embodiment of the present invention, some of the users (such as technical support centers) may use these notifications just as advisories (a new technical tip was added). In another embodiment of the present invention, other users such as technical writers, may use the notifications as a trigger to update current documentation whether it means adding new content or correcting existing content. In yet another embodiment of the present invention, development engineers may use the auto email notifications as a means to clarify messages and imbed those resulting clarifications into the next release of software. In still another embodiment of the present invention, the auto email notification may be utilized with the building of both online and printed documents.

It should be further appreciated that by virtue of the auto email notification feature of the IDD (interactive dynamic documentation web site) 40, any user enrolled in auto email notification is thereby notified of changes with regard to the content or document with which they are associated. Additionally, the contributor IDs are tracked for all content contributions whether in the form of new content, corrections to content, validation of content, and comments on content. This is used to provide the means for follow up queries to the contributor as well as enabling the ability to produce reports on contributions.

Figure 6A:
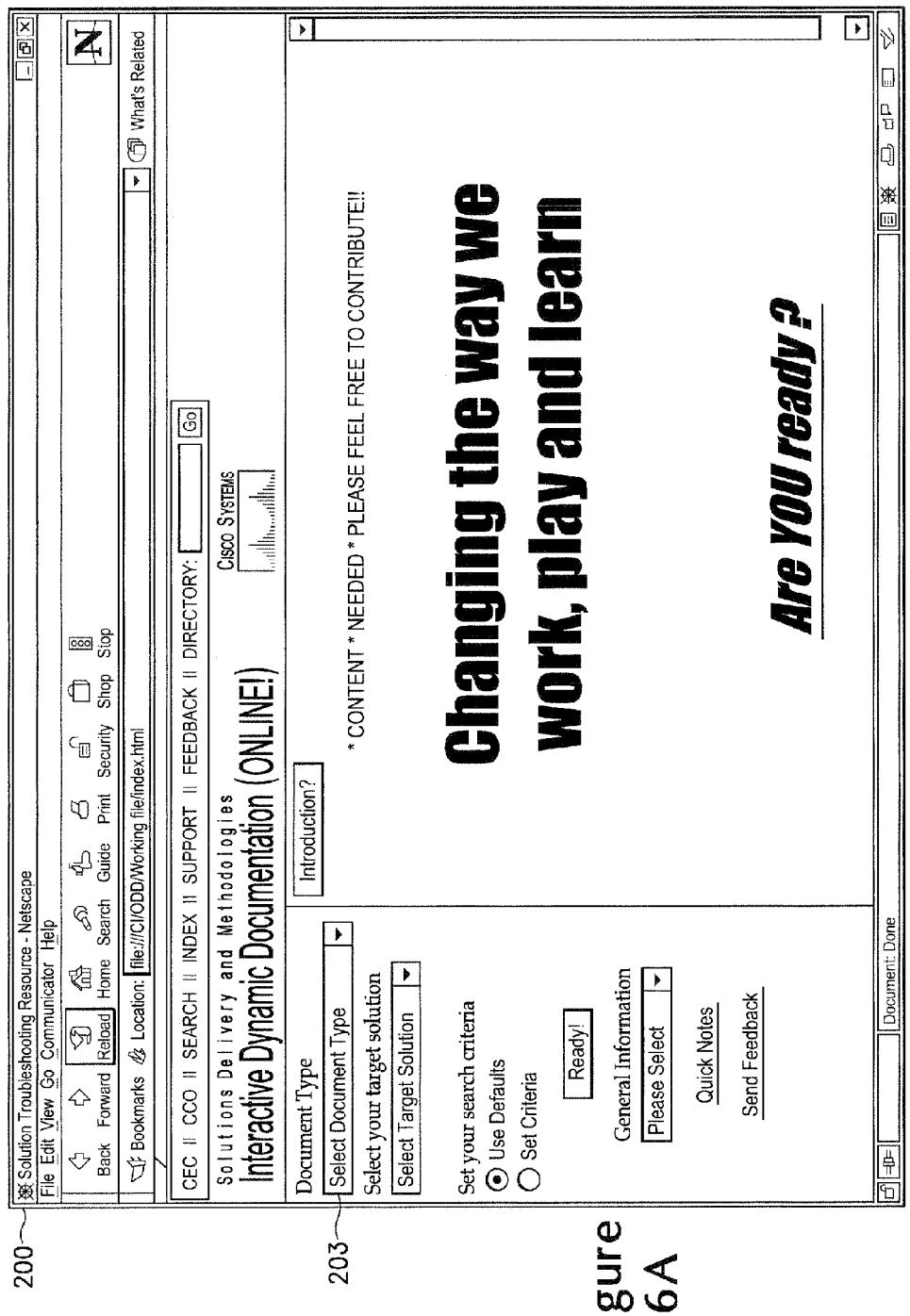
FIG. 6A is computer generated screen shot depicting a web page analogous to the web page of FIG. 5, in accordance with one embodiment of the present invention.

Selection of Document Type and Target Solution:

In FIG. 6A, shown is index page 200 of IDD (interactive dynamic documentation web site) 40, in one embodiment of the present invention. Index page 200 is the initial web page displayed to a user subsequent to that user logging on and having access to IDD 40 granted. Index page 200 of FIG. 6A is analogous to index page 200 of FIG. 5.

Figure 6B:
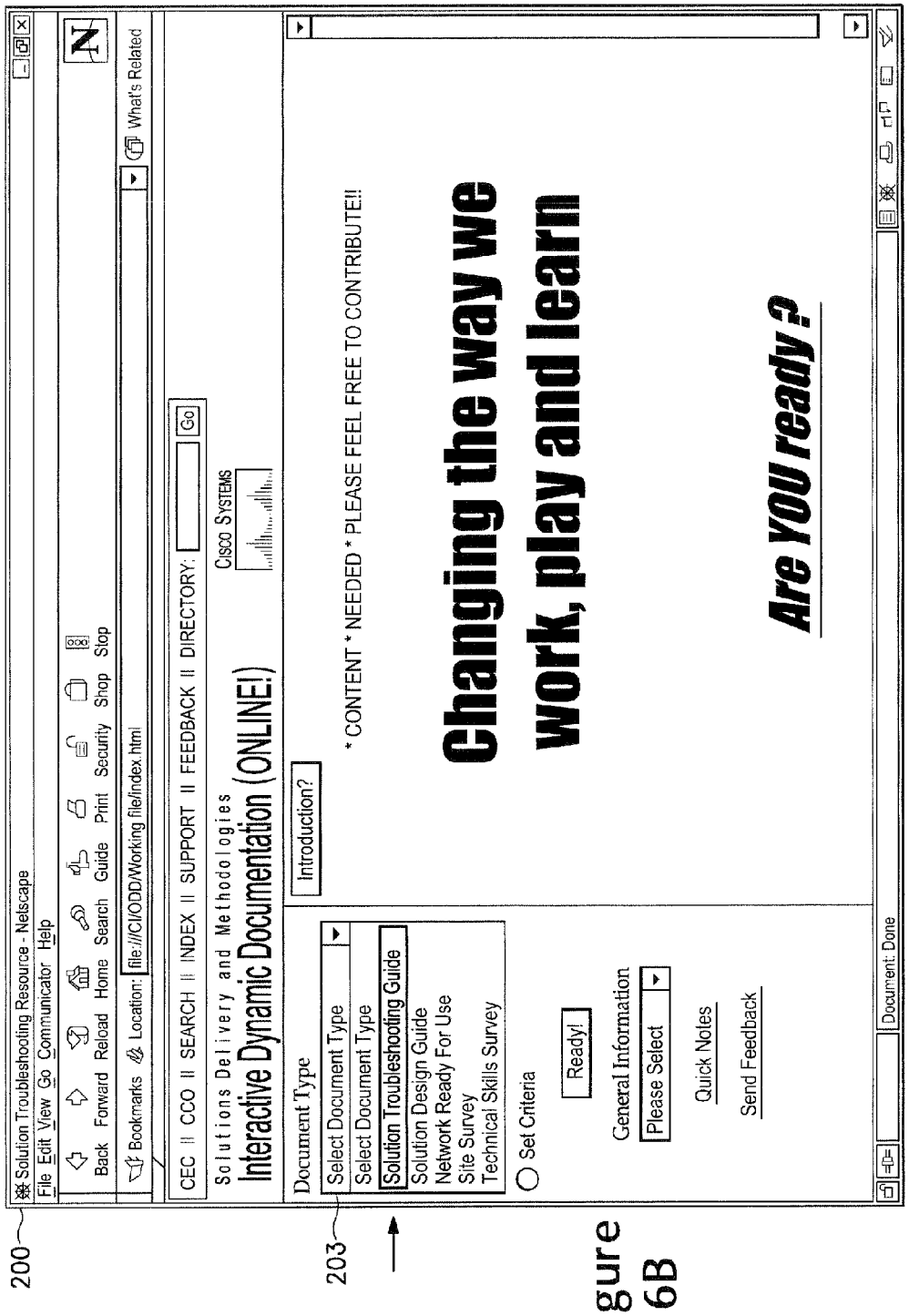
FIG. 6B is a computer generated screen shot depicting, in a sequential order, the web page of FIG. 6A, in accordance with one embodiment of the present invention.

In FIG. 6B, a sequential continuation of FIG. 6A, in one example of one embodiment of the present invention, a user might desire to build a solution troubleshooting guide related to the ThunderDial 2.1 solution. As such, the user activates PDM (pull down menu) 203, scrolls down to and selects the solution troubleshooting guide, as shown in FIG. 6B. Once the user has selected, in this example, the solution troubleshooting guide, it is then displayed in the text window of PDM 203, as shown in FIG. 6C.

Figure 6C:
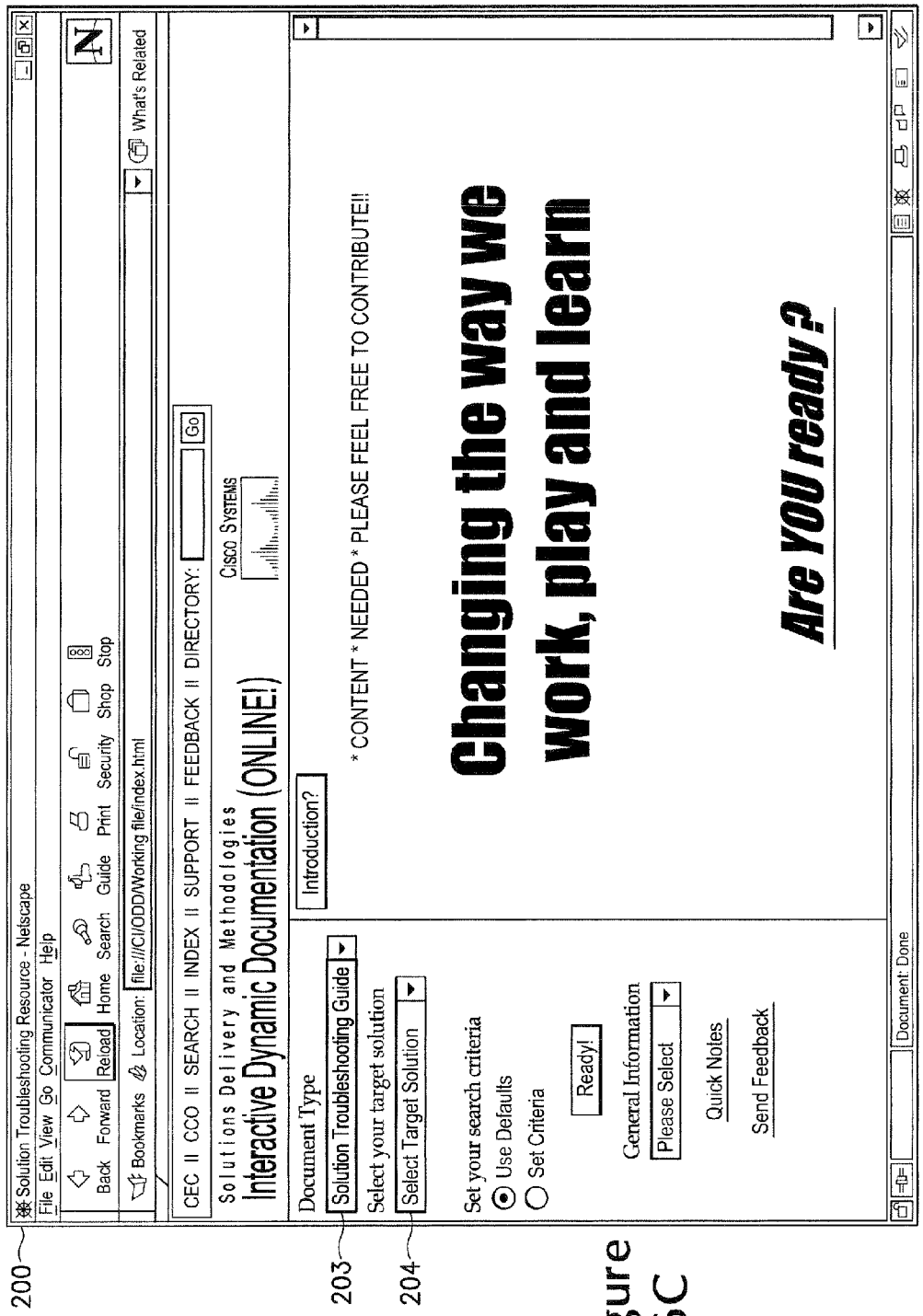
FIG. 6C is a computer generated screen shot depicting, in a sequential order, the web page of FIG. 6B, in accordance with one embodiment of the present invention.

FIG. 6C, a sequential continuation of FIG. 6B, in one example of one embodiment of the present invention, shows the selection of a solution troubleshooting guide as the document type, as shown as displayed in PDM 203, as discussed above. Once a user has selected a document type, a user would choose a solution as the subject matter for the document type that will be built. A user, in this example of one embodiment of the present invention, might desire to build the specified troubleshooting guide on a target solution such as Thunder Dial 2.1. As such, the user activates pull down menu 204, scrolls down to and selects the solution relating to Thunder Dial 2.1, as shown in FIG. 6D.

Figure 6D:
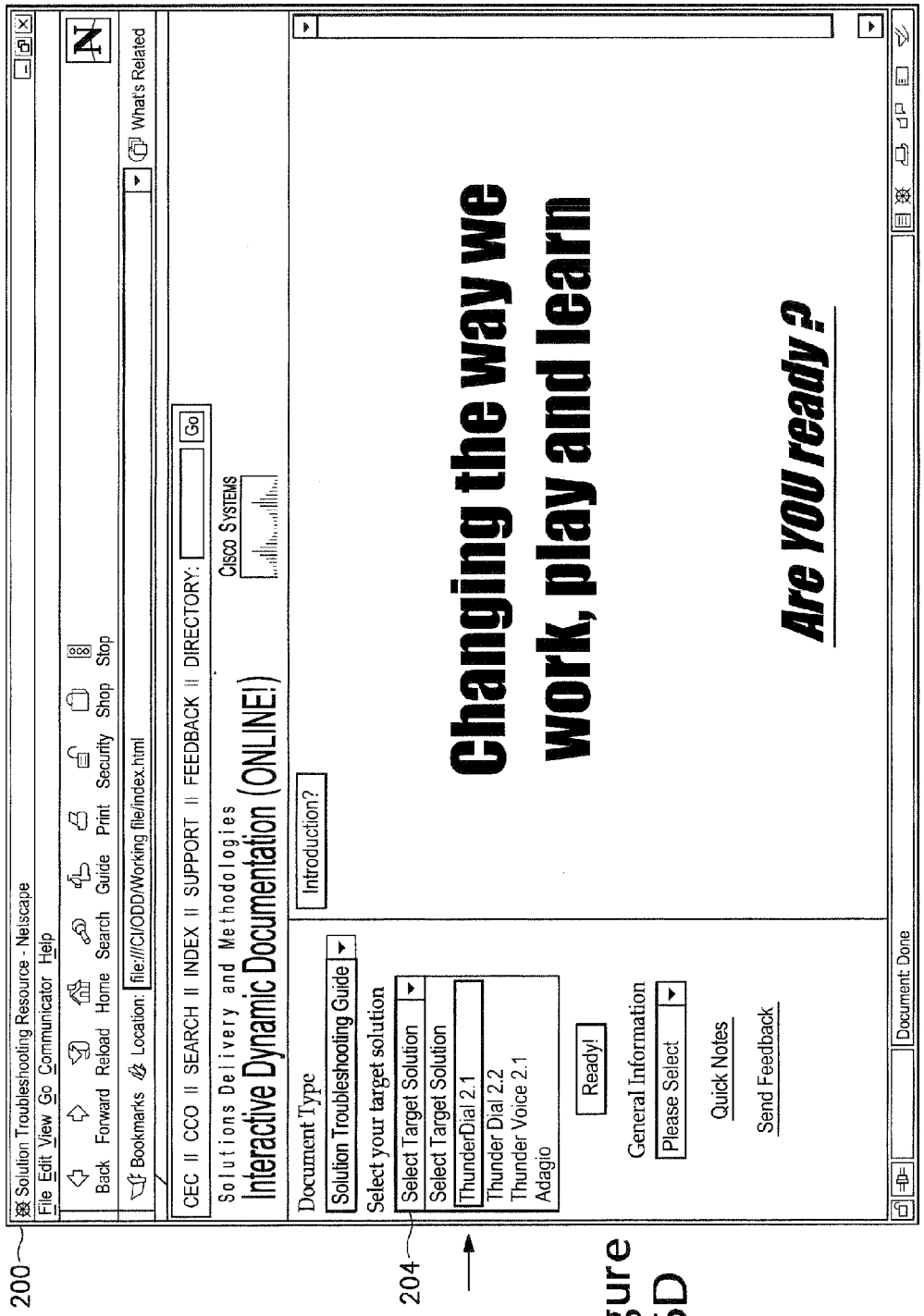
FIG. 6D is a computer generated screen shot depicting, in a sequential order, the web page of FIG. 6C, in accordance with one embodiment of the present invention.

In FIG. 6D, a sequential continuation of FIG. 6C, shows the user activating PDM (pull down menu) 204 to select the desired solution/product. Once the user has selected the desired solution/product, in this example of the present invention, the ThunderDial 2.1 solution, it is then displayed in the text window of PDM (pull down menu) 204, as shown in FIG. 6E.

Figure 6E:
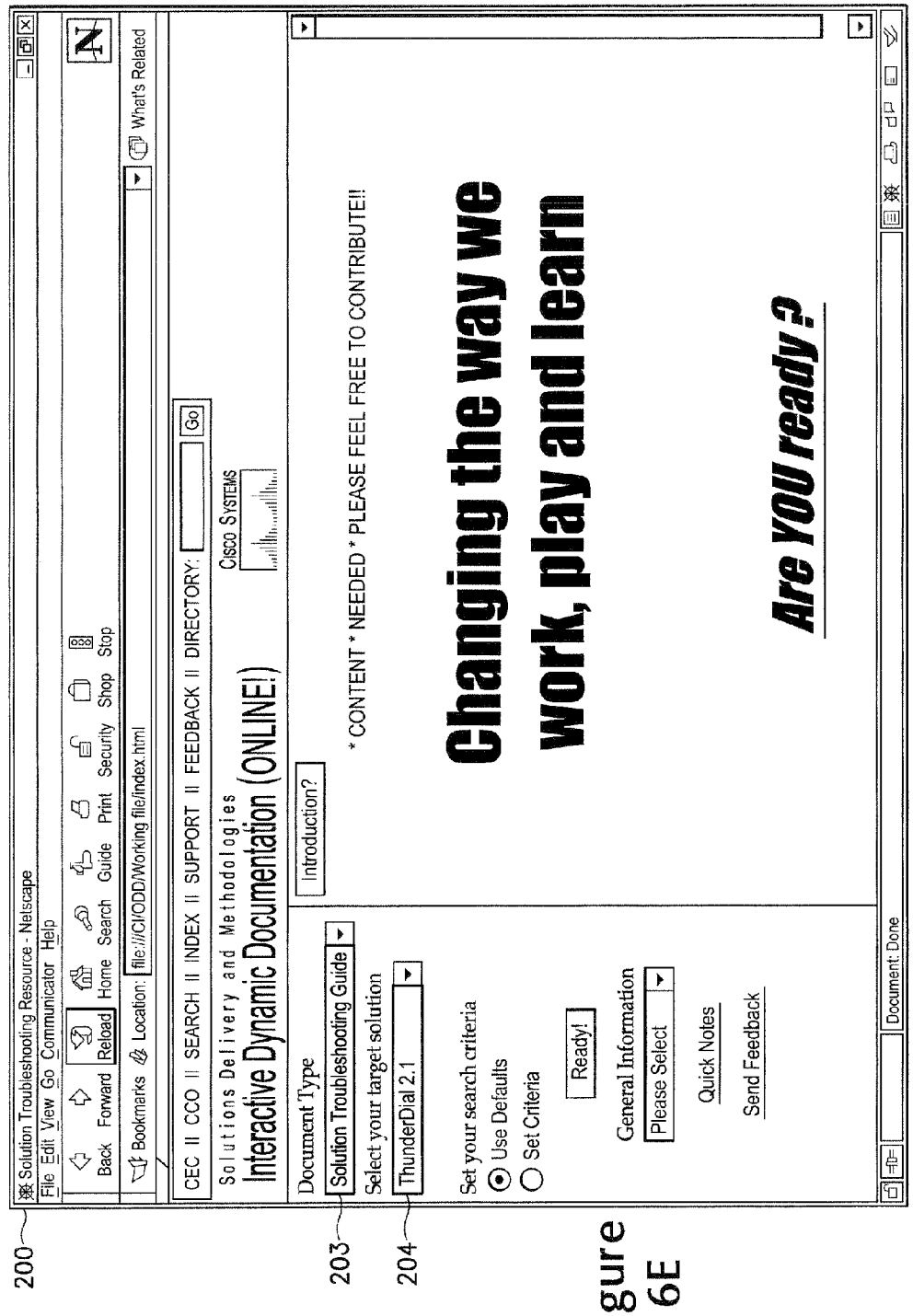
FIG. 6E is a computer generated screen shot depicting, in a sequential order, the web page of FIG. 6D, in accordance with one embodiment of the present invention.

FIG. 6E, a sequential continuation of FIG. 6D, shows, in PDM (pull down menu) 203, solution troubleshooting guide as the selected document type, and also shows, in PDM 204, ThunderDial 2.1 as the selected target solution for which the troubleshooting guide will be built. At this point, the user determines whether to retrieve all the information regarding the ThunderDial 2.1 solution by selecting use defaults radio button 205 or to further define the retrieved information by selecting set criteria radio button 206. In this example of one embodiment of the present invention, the user has determined to further define the retrieve information by selecting the set criteria radio button 205, as shown in FIG. 6F.

Figure 6F:
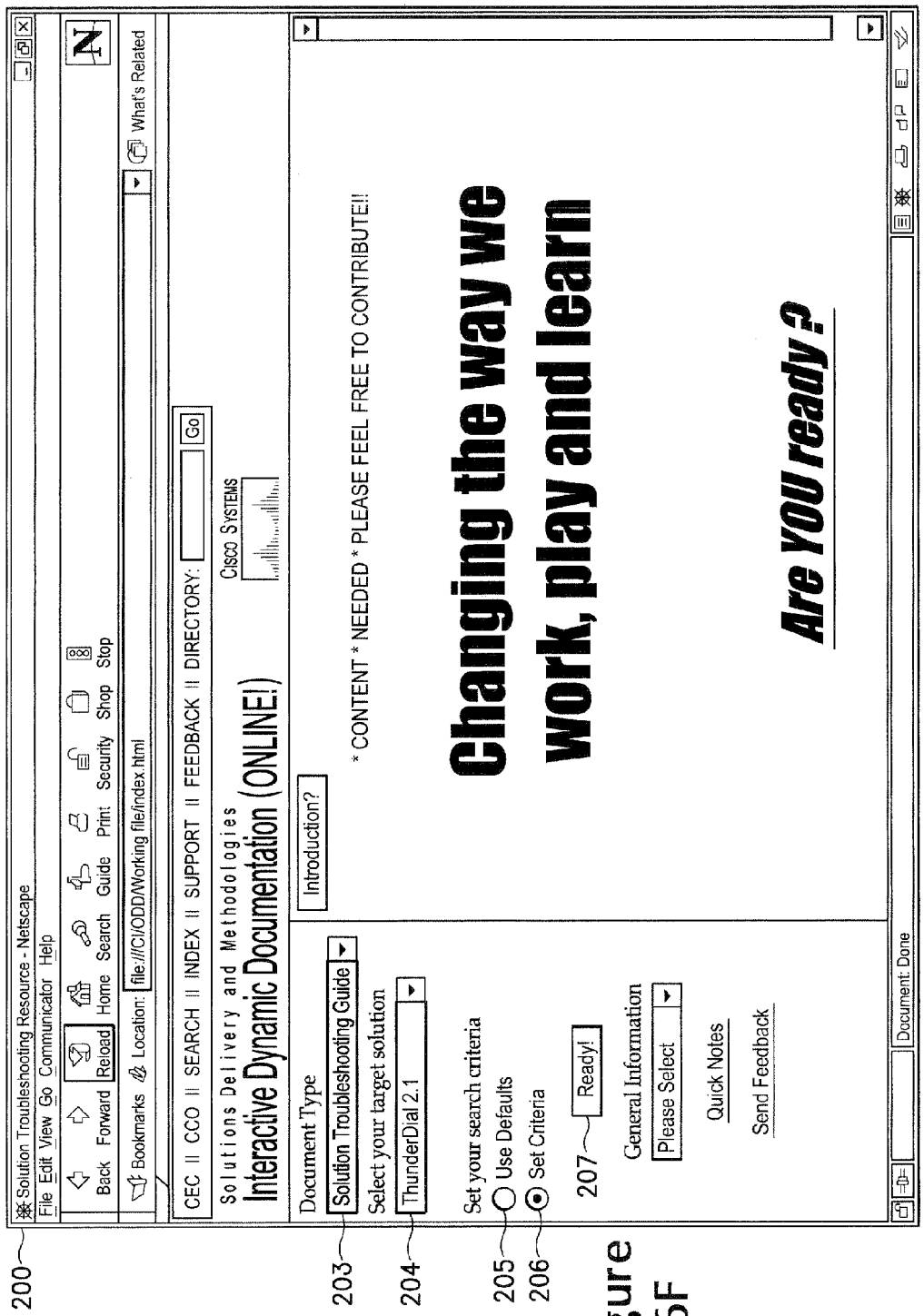
FIG. 6F is a computer generated screen shot depicting, in a sequential order, the web page of FIG. 6E, in accordance with one embodiment of the present invention.

FIG. 6F, a sequential continuation of 6E, shows set criteria radio button 206 selected, which has simultaneously deselected radio button 205. The user then clicks on ready button 207, as shown in FIG. 6F and new web pages, one based upon the previously selected document type, and one based upon the selected target solution, are retrieved and displayed.

It should be further appreciated that the subsequent web pages retrieved and displayed will be reflective of the chosen document type and the chosen target solution/product. It should be further appreciated that had a different document type been selected, e.g., a site survey, the subsequent pages retrieved and displayed would be reflective of that selected document type.

It should be appreciated that the document type selected is actually retrieval of a template that in turn forces the user to adhere to a pre-determined structure or list of topics, sub-topics and fields for that document type. For example, the selected troubleshooting guide would provide one set of general elements, e.g., sections, sub-sections, and fields, whereas a design guide would provide an entirely different set of general elements.

Figure 8A:
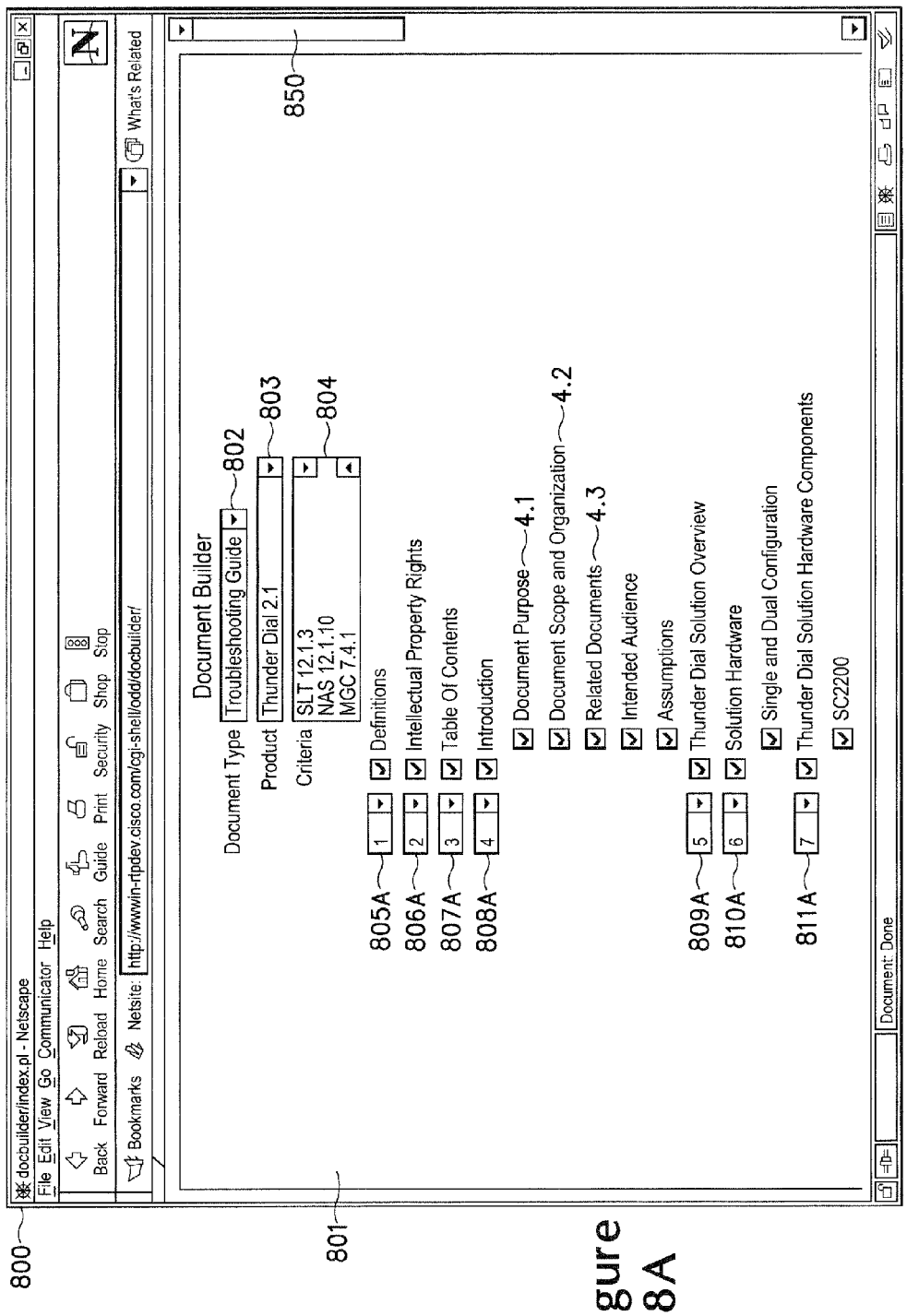
FIG. 8A is a computer generated screen shot depicting one example of a document builder, in accordance with one embodiment of the present invention.

In one embodiment of the present invention, those new web pages, reflective of the actions described in FIG. 6F, are depicted in FIG. 7A, which is reflective of selected target solution ThunderDial 2.1, and in FIG. 8A, which is reflective of the selected document type, in this example the troubleshooting guide.

With reference to FIG. 7A, which shows web page 700, the web page displayed in response to the ready button being clicked on from FIG. 6F. In web page 700, shown as disposed within region 202 are multiple PDMs (pull down menus), wherein each PDM contains a topic from which the document builder can draw information. Shown as disposed within region 211 is a general overview of the selected solution from FIG. 6D, which in this example, is the ThunderDial 2.1 solution, in one embodiment of the present invention.

It should be further appreciated that both web pages, the web page of FIG. 7A and the web page of FIG. 8A are displayed simultaneously, overlaid in a staggered manner, thereby enabling a user to easily and seamlessly switch back and forth between the two web pages while determining the actual content of the document and the order of that content in the document which the user is building.

Utilization of the Document Builder

The document builder of IDD (interactive dynamic documentation web site) 40 is a customizable document builder. The document builder enables a user to create documents according to the user's needs and requirements, with regard to subject matter and the order in which the subject matter appears in the document that the user is building.

Referring now to FIG. 8A, shown is document builder 800, in one embodiment of the present invention. As shown, document builder 800 is a troubleshooting guide for the ThunderDial 2.1. This is the resulting initial document builder provided to the user, and is reflective of the selected document type and target solution/product, as previously discussed in FIGS. 6B and 6D.

With reference still to FIG. 8A, shown disposed within region 801 and disposed toward the top are three PDMs (pull down menus), from top to bottom, PDM 802, PDM 803, and PDM 804, in one embodiment of the present invention Still referring to FIG. 8A, also shown disposed within region 801, and beneath PDMs 802, 803, and 804, are selectable SDs (sequence determinators), from top to bottom, 805A, 806A, 807A, 808A, 809A, 810A, and 811A, respectively. As evidenced by scroll bar 850, shown as disposed along the right side of region 201, numerous other sequence determinators are present but not visible. The numbers shown in each of the SD (sequence determinator) boxes is reflective of the order in which that box's element, whether that element is a heading, topic, sub-topic, or field, will appear in the document the user is building. It should be appreciated that the sequence numbering commences with one and continues up to "x", where x represents the number of elements for the selected document type.

With reference still to FIG. 8A, in this example, of one embodiment of the present invention, shown is SD (sequence determinator) 806A, reflective of intellectual property rights, as the second ordered topic, after definitions (SD 805A), of the document to be built. If, however, in another embodiment of the present invention, the user had decided that intellectual property rights (SD 806A) should come after, e.g., the introduction (SD 808A), a user would select the number four instead of the number two. This re-numbering would change the ordered sequence position of the intellectual property rights from ordered sequence position two as depicted in FIG. 8A to ordered sequence position four, and would be disposed beneath introduction (SD 808A). When the user altered the order of the elements, in this example, those affected elements were automatically incremented or decremented accordingly.

Still referring to FIG. 8A, in this example, of one embodiment of the present invention, table of contents (SD 807A), ordered sequence position three, would have been changed to ordered sequence position two (SD 806A), and introduction (SD 808A), ordered sequence position four, would be changed to ordered sequence position three (SD 807A).

Additionally, and still with reference to FIG. 8A, included in introduction (SD 808A) were the various sub-topics; document purpose 4.1, document scope and organization 4.2, related documents 4.3, and so on, in one embodiment of the present invention. By re-ordering the elements, and by moving introduction (SD 808A), ordered sequence position four, to ordered sequence position three, SD 807A, the sub-topics were also re-numbered. Document purpose 4.1 was changed to 3.1, document scope and organization 4.2 was changed to 3.2, related documents 4.3 was changed to 3.3, and so on.

It should be appreciated that adjacent to each topic or sub-topic is a user activated check box. By default, all the available check boxes are checked, and therefore, activated. When the check mark is visible, that specific topic or sub-topic will be included in the document being built. Conversely, if the check mark is not present, that topic or sub-topic will not be included in the document being built. Further, when an element is unchecked, the document builder automatically removes that element from the list of elements, and the other elements are subsequently re-numbered, analogous to the re-numbering as described in the previous paragraph.

It should be further appreciated that the user is provided with a refresh function for the document builder. This enables a user to refresh the displayed document builder to reflect the changes made up to that point, e.g., elements unchecked, re-sequenced, etc. When the user clicks on the refresh button, rather than show the elements of the document builder in an out-of-order manner, the displayed elements will be reflective of those changes, and display a new screen that shows the selected items, (and only those selected items) in the newly re-sequenced positions, as determined by the user.

Figure 8B:
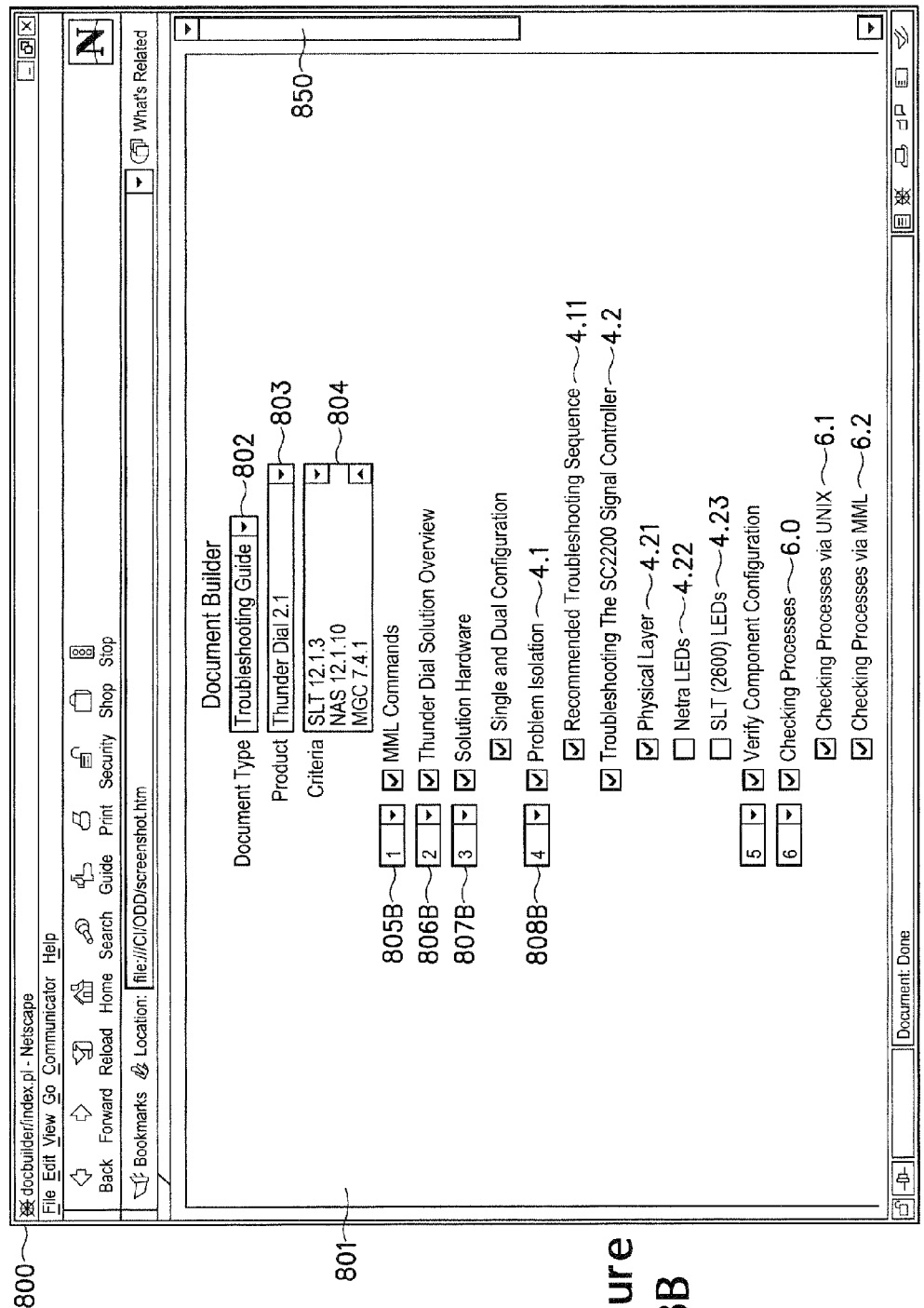
FIG. 8B is a computer generated screen shot of another example of a document builder, in accordance with one embodiment of the present invention.

With reference now to FIG. 8B, shown is document builder 800, functionally analogous to the document builder of FIG. 8A, in another embodiment of the present invention. In this example, PDMs (pull down menus) 802, 803, 804 are analogous to those in FIG. 8A. In PDM 802, shown is the selected document type, troubleshooting guide, reflective of the selection described in FIG. 6B. In PDM 803, disposed beneath PDM 802, shown is the selected solution, ThunderDial 2.1, reflective of the selection described in FIG. 6D. In PDM 804, disposed beneath PDM 803, shown are the criteria settings, reflective of the selections as described in FIG. 7A, in one embodiment of the present invention.

Still in FIG. 8B, it should be appreciated that sequence determinators 805A-808A of FIG. 8A were deselected, in this example of one embodiment of the present invention. The user, having decided that MML commands should be first and, as such, given ordered sequence number one, replace SD (sequence determinator) 805A of FIG. 8A, with SD (sequence determinator) 805B as shown in FIG. 8B. Beneath SD 805B is SD 806B, the thunder dial solution overview topic, which in FIG. 8A was disposed at SD 809A. Shown as SD 807B is the solution hardware topic, which was SD 810A of FIG. 8A. Shown as SD (sequence determinator) 808B, in this example of one embodiment of the present invention, is the problem isolation topic. Associated with SD 808B are a variety of sub-topics, numbered 4.1, 4.11, 4.2, 4.21, 4.22, 4.23, 6.0, 6.1, 6.2, etc. This further illustrates the re-numbering function of the document builder with regard to sequence re-ordering.

It should be further appreciated that topics and sub-topics that are associated with each other are enforced thusly. This means that individual sub-topics, e.g., individual MML commands are confined within the constraints of the main topic MML commands, and as such, will remain a sub-topic thereof. This will not prevent the main topic, MML commands, from being re-sequenced or excluded (unchecked), but it will prevent individual MML commands from being re-sequenced into another main topic heading, in one embodiment of the present invention.

Document builder 800, in one embodiment of the present invention, further enables the user to export massive content, e.g., log messages that may number in excess of 1200, to external data files. It is generally considered impractical to print the entire list of log messages, even when release specific. Therefore, this type of information, (large blocks of data related to a single topic) will default to online viewing only. However, included is a selection box that enables the user to specify retrieval and inclusion for a subset of this information. For example, a user could specify only critical or major log messages. Then a count of those specified log messages would be displayed, with a checkbox, (unchecked by default) for the user to include if deemed necessary or required.

The retrieval from the database is then initiated and is software driven. Database retrieval is hierarchical, meaning from the top down, thereby keeping sub-topics as a natural progression from the main topics.

While the present embodiment of the present invention is discussed in the context of a pre-determined fully customizable document layout, it should be appreciated that also included in the document builder is the function of enabling a user to build a custom document. This embodiment of the present invention is applicable when a template driven document builder will not fill a users specific needs. The custom document function will allow solution and/or product selection. The custom document function will further allow a user to specify the documents and sections from which that information is retrieved. This retrieval would be based upon the document fields rather that the document type.

For example, in one embodiment of the present invention, if a training organization desires to build a document for educational or training purposes, they would want to pick and choose the document elements instead of the entire pre-defined document. The training organization will still select the solution or product and the related criteria. They may also desire to chose different topics from different solutions or products. For example, they may desire troubleshooting procedures from a ThunderDial troubleshooting guide, a solution overview from a design guide, and MML commands from a general command reference guide.

It should be appreciated that, in one embodiment of the present invention, multiple documents may use the same information and will benefit from pulling content from a single source which ensures that the information is in synch. Multiple documents having the functionality of using the same information drawn from the same source, the reusing of content for utilization in multiple documents, will, under most circumstances, be correct, current, more comprehensive and cost effective.

It should be appreciated that after retrieving the necessary content and finalizing the sequence order of the document, the user clicks on the assemble document button. This triggers the database queries, and the retrieved data will be retained within a buffer as one contiguous data block, in one embodiment of the present invention.

At this point, the user will be able to view the entire customized document online. It will be one complete document incorporating all of the selected and re-sequenced elements, topic, sub-topics, and fields, in one embodiment of the present invention. Provided that the user is satisfied with the online display (the customized document), the user will select an output format from a pull down menu. In one example, the selected output may be to a data file, e.g., saved to a media storage device. In another example, the selected output may be printed in ASCII text. In yet another example, the selected output may be printed in HTML. In still another example, the selected output may be printed as a word document. The above list of output formats should not be considered exhaustive, but used to illustrate the variety of output formats available which may comprise one example of one embodiment of the present invention.

It should be further appreciated that once the output format has been determined, the user clicks on the print document button to initiate final document delivery based upon the users specific requirements for that particular document, at that particular time.

Figure 9:
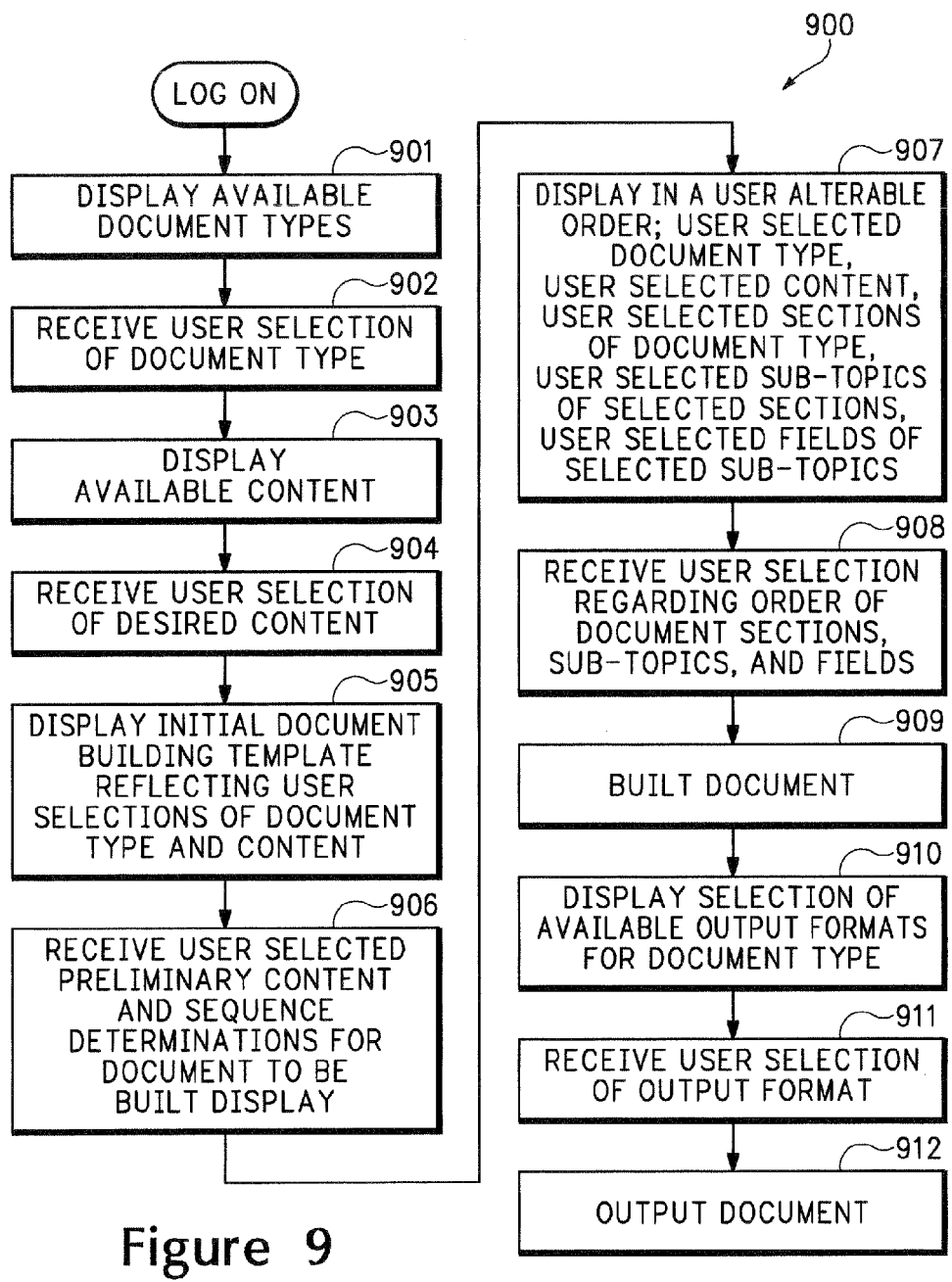
FIG. 9 is a flowchart showing the steps of a method for utilizing a document builder, in accordance with one embodiment of the present invention.

FIG. 9 is a flowchart showing the steps in a method 900 for utilization of a document builder, in one embodiment of the present invention.

In step 901, the document builder causes a retrieval and display of, in PDM (pull down menu) 203 of FIG. 5, a listing of the document types available from which the user may select, as shown in FIG. 6B, in one embodiment of the present invention.

In step 902, the document builder receives the user selection, and subsequently causes the display of the selected document type in PDM (pull down menu) 203, as shown in FIG. 6C, in one embodiment of the present invention.

In step 903, the document builder causes a retrieval and display of, in PDM 204 of FIG. 5, a listing of the target solutions or products available from which the user may select, as shown in FIG. 6D, in one embodiment of the present invention.

In step 904, the document builder receives the user selection, and subsequently causes the display of the selected target solution or product in PDM (pull down menu) 204, as shown in FIG. 6E, in one embodiment of the present invention.

In step 905, subsequent to the user clicking on the ready button, as shown and described in FIG. 6F, the clicking on the ready button by the user causes the document builder to retrieve and display an initial document building template as shown in FIG. 8A, reflective upon the user selected document type as described in FIG. 6B, and to retrieve and display the subject matter of the document to be built as shown in FIG. 7A, reflective of the user's selected target solution/product, as described in FIG. 6D, in one embodiment of the present invention.

In step 906, displayed is the initial document builder displayed, as shown in FIG. 8A, which enables a user to make a variety of selections and determinations with regard to not only the content elements of the document to be built, but also the order in which those elements of the content will appear. In one embodiment, the content elements include sections, sub-sections, and fields, each element customizable as to inclusion in the document and to the order in which that element will appear, as shown in FIG. 8A, in one embodiment of the present invention.

In step 907, after the step 906 is completed and the user clicks on the refresh button, the document builder causes a display of the selected elements and the sequence of those element, as shown in FIG. 8B, in one embodiment of the present invention.

In step 908, after the user has reviewed the displayed document builder and the related elements and sequencing, the user clicks on the assemble document button. This causes the query of the database by the document builder for the retrieval and sequencing of the content as determined by the user, in one embodiment of the present invention.

In step 909, the document builder caused document is saved in a buffer as one contiguous data block, where the user can now view the assembled document online as one complete document incorporating the selected and re-sequenced elements.

In step 910, the document builder causes the retrieval and display of the output formats available from which the user may select, in one embodiment of the present invention. In one example, the output may be to print in ASCII text. In another example, the output may be to print as HTML. In yet another example, the output may be to print as a word document. In still another example, the output may not be to print, but to save the document in a media storage device, e.g., a hard drive.

In step 911, the document builder receives from the user their selected output format for the document that is built, and initiates the output thereof in step 912, in one embodiment of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
one or more processors; and
a memory coupled to the processors comprising instructions executable by the processors, the processors operable when executing the instructions to:
display one or more interactive dynamic document web pages, at least one of the interactive dynamic document web pages including a control window and a content window;
display a user selectable document type menu in the control window, the document type menu allowing a user to select between different documents types including a product description guide document type;
display a user selectable product type menu in the control window, the product type menu allowing a user to identify a good or service;
identify a storage medium storing a plurality of different documents, the storage medium further including sorting data that classifies the different documents by document type and associated product type;
filter the different documents according to a comparison of the sorting data to user selections that are input using the menus;
display, in the content window, at least one of the different documents remaining after the filtering of the different documents, the displayed document corresponding to the user selections that are input using the menus;
generate a document builder window on a same or another one of the interactive dynamic document web pages, the document builder window displaying a plurality of entries corresponding to different default sections belonging to the document displayed in the content window; and
display, in the document builder window, removal selection switches and relative ordering controls for the entries, each of the removal selection switches controlling removal of a corresponding one of the default sections from the displayed document responsive to user requests and each of the relative ordering controls for manipulating an ordering within the displayed document for a corresponding one of the default sections responsive to the user requests.

2. The apparatus of claim 1 wherein the document remaining after the filtering includes a first amount of the different default sections ordered in a first sequence when extracted from the storage medium and a customized view of the displayed document included in the content window after receiving the user requests includes a second smaller amount of the default sections ordered in a second different sequence.

3. The apparatus of claim 1 wherein the processors are further operable to dynamically update the document displayed in the content window based on the user requests that are input using the removal selection switches and the relative ordering controls.

4. The apparatus of claim 3 wherein the processors are further operable to store the updated document as a new document in the storage medium responsive to a command input by the user thereby allowing the user to build the new document by modifying the document selected through the filtering by inputting the user requests that trigger removal of a subset of the default sections and that trigger reordering of the default sections.

5. The apparatus of claim 4 wherein the default sections include a table of contents section and a product overview section.

6. The apparatus of claim 5 wherein the processors are further operable to:
dynamically update the document builder window according to the user requests so that ones of the entries that correspond to deselected ones of the default sections are removed from view; and
dynamically update the document builder window according to the user requests for dynamically reordering the entries in the document builder window.

7. The apparatus of claim 6 wherein the dynamic updating of the document builder window occurs simultaneously with refreshing the content window with the updated document.

8. The apparatus of claim 3 wherein the processors are further operable to causing printing of the updated document displayed in the content window thereby allowing the user to print only preferred ones of the default sections in a preferred sequence selected by the user.

9. A system comprising:
a server hosting a website for providing a plurality of documents that describe products or services offered for sale on the website, the documents having different sections including product overview sections and an intellectual property rights sections;
a computer located remotely from the server and including a web browser operable to allow a user to navigate the website;
the server operable to select at least one of the documents according to control inputs sent from the remotely located computer;
the server operable to display a document builder window on a web page associated with the website responsive to receiving the control inputs, the document builder window including entries corresponding to ones of the sections that are included in the selected document such that the entries include at least a first entry for the product overview section of the selected document and a second entry for the intellectual property right section of the selected document;
the server operable to display controls in the document builder window, the controls allowing the user to deselect one or more of the entries and change a displayed ordering of the entries;
the server operable to provide the user a dynamically generated custom view of the selected document according to user requests submitted using the controls.

10. The system of claim 9 wherein the dynamically generated custom view includes the product overview section ordered before the intellectual property rights section regardless of whether the product overview section was ordered before the intellectual property rights section in the selected document.

11. The system of claim 9 wherein the dynamically generated custom view includes the product overview section but not the intellectual property rights section thereby allowing the user to view the selected document without the intellectual property rights section.

12. The system of claim 11 wherein the dynamically generated custom view of the selected document allows the user to print only preferred ones of the sections in a preferred sequence specified using the controls displayed in the document builder window.

13. A system comprising:
means for storing a plurality of documents each having sections, sub sections and fields arranged in a default sequence;
means for displaying a list comprising said plurality of documents to accommodate a selection of at least one of said plurality of documents by a user;
means for retrieving a selected document template from said storage, subsequent responsive to receiving a user selection from the list; and
means for displaying to the user said selected document and a document builder window having different entries that correspond to the different ones of the sections, sub sections and fields that are associated with the selected document, the document builder window configured to allow the user to deselect different entries and to specify a custom ordering of the different entries; and
means for displaying to the user a custom view of the document, the custom view incorporating only those sections, sub sections and fields corresponding to entries that are not deselected by the user using the document builder window and including an ordering of those sections, sub sections and fields that corresponds with a custom sequence of the entries that is selected by the user using the document builder window.

14. The system of claim 13 comprising:
means for allowing the user to print the custom view so that only preferred ones of those sections, sub sections and fields as indicated by the user using the document builder window are printed.

15. The system of claim 14 wherein the printed custom view includes the preferred ones of the sections, sub sections and fields arranged in the custom sequence selected by the user that is different from a default sequence used in the selected document when the selected document is retrieved.

16. The system of claim 13 further comprising means for adding a new document to the storage, the new document based on the custom view such that the new document incorporates only those sections, sub sections and fields that correspond to entries that are not deselected by the user and includes an ordering of those sections, sub sections and fields based on the custom sequence.

17. A method comprising:
storing a plurality of complete documents for publishing on a website, each of the complete documents comprising different sections, sub-sections and fields arranged in an order selected before the documents are published to the website;
displaying a list comprising said plurality of complete documents to accommodate a user selection of at least one of said plurality of complete documents by a user after publishing the complete documents on the website;
retrieving a selected complete document from said storage, subsequent to receiving the user selection; and
displaying to the user said selected complete document and a document builder window, the document builder window configured to enable the user to specify a custom view that includes only a subset of the different sections, sub-sections and fields arranged in a user selected ordering that is independent from the order selected before the complete documents are published to the website.

18. The method of claim 17 further comprising printing the custom view so that a printer output of all viewable portions of the custom view includes only preferred ones of those sections, sub sections and fields as indicated by the user using the document builder window.

19. The method of claim 18 wherein the printer output includes the preferred ones of the sections, sub sections and fields arranged in the user selected ordering that is independent from the order selected before the complete documents are published to the website.

20. The method of claim 17 further comprising adding a new document to the storage, the new document based on the user-specified custom view such that the new document incorporates only those sections, sub sections and fields that correspond to entries that are not deselected by the user and includes an ordering of those sections, sub sections and fields based on the user selected ordering.

* * * * *